July 10, 1928.
O. KANAWYER ET AL
CLOTHESLINE POLE AND REEL
Filed Feb. 21, 1927
1,676,696
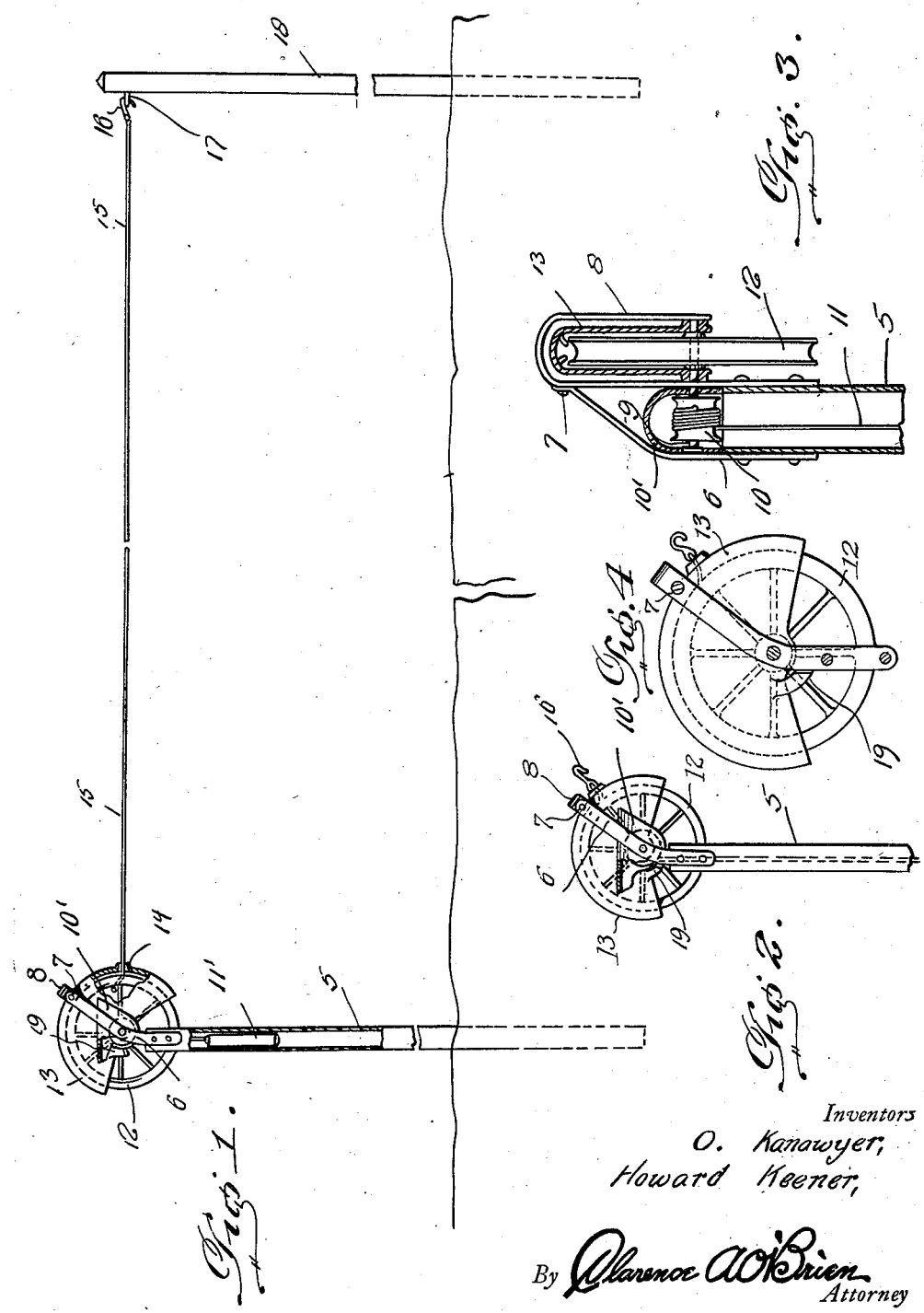
Inventors
O. Kanawyer,
Howard Keener,
By Clarence A. O'Brien
Attorney Patented July 10, 1928.

1,676,696

UNITED STATES PATENT OFFICE.

OSCEOLA KANAWYER AND HOWARD KEENER, OF HUNTINGTON BEACH, CALIFORNIA.

CLOTHESLINE POLE AND REEL.

Application filed February 21, 1927. Serial No. 170,008.

This invention relates to new and useful improvements in combined clothes line poles and reels, and aims to provide means for automatically winding a clothes line upon a suitable reel when the free end of the same is released from a pole or other means of attachment located in spaced relation from my combined device with the end in view that the line will not be exposed to the weather when not in use.

The invention further aims to provide a device of this character wherein the line, the length of which is determined by the spaced relation of the present device, and the point of attachment for the free end thereof is maintained relatively taut so as to overcome the necessity of using props or other supporting devices.

A further salient object resides in the provision of a combined pole and reel that is of extremely simple construction, inexpensive of manufacture and installation and one that consists of but few parts and these so corelated as to reduce the possibility of disarrangement and inoperation to a minimum.

With the foregoing and other objects in view as the nature of the invention will be better understood the same comprises the novel form, combination and arrangement of parts hereinafter more fully described, shown in the accompanying drawing and claimed.

In the drawing wherein like reference characters indicate corresponding parts throughout the several views:

Figure 1 is a view partly in side elevation and partly in cross section of my combined pole and clothes line reel constructed in accordance with the present invention and shown as disposed in spaced relation with a suitable supporting pole for the free end of the line which is extended between the device and said pole.

Figure 2 is an upper end elevation of the device, the line being in wound condition upon the reel.

Figure 3 is a detail section through the upper end of the device for more clearly disclosing the reel and the means for automatically causing the same to rotate for winding the line thereon when the free end thereof is released, and Figure 4 is a detail view showing the finger that depends from the pivotal housing engaging the standard.

Now having particular reference to the drawing, 5 designates a hollow pole, preferably of metal, and a predetermined length the lower end of which is anchored within the ground and at a substantial distance beneath the surface thereof as indicated by the dotted lines in Figure 1. Rigidly secured to the upper end of this hollow pole which is open as clearly indicated in Figure 3 is the lower end of a metallic arm 6 which arm at a point above the upper end of the pole is bent inwardly thereacross and is rigidly secured as at 7 to an inverted relatively U-shaped shaft hanger 8, the inner leg of which is of greater length and is rigidly secured at its lower end to the upper end of the pole 5 in opposed relation to the arm 6. Rotatably arranged through the lower ends of the hanger 8 and within a bearing at the inner face of the arm 6 directly above the hollow pole 5 is a shaft 9. Keyed to this shaft directly above the pole 5 is a small cable drum 10 to which is attached one end of a predetermined length of cable 11 to the opposite end of which is secured a weight 12 freely movable within the pole 5. Arranged over this drum 10 is a small housing 10'.

Keyed to the shaft 9 at the side of the pole 5 is a large cable reel 12 over which is disposed a segmental housing 13 having openings at its center through which the shaft 9 passes as in Figure 3. Directly in front of the shaft 9 this segmental housing 13 is formed with an opening 14 through which the clothes line 15 passes, which line is secured at its inner end to the reel 12 in any desirable manner.

The free end of the line 15 is equipped with a hook 16 so that after the same has been fully drawn from the reel 12 the line may be supported in horizontal taut condition by engaging the hook 16 over an eye or the like 17 arranged upon the upper end of a pole 18 or other suitable support arranged in spaced relation with respect to my device, a distance substantially equivalent to the length of the line 15 so that when the same is secured at its free end, the line will be entirely unwound from the reel 12 so that it will be maintained in taut condition so as to overcome the requirement of supporting the same by poles or the like when clothes are hung thereon.

Obviously when the line is drawn from the reel 12 the weight cable 11 will be caused to wind upon the drum 9 which will of course raise the weight 11' within the hollow pole 5. When the free end of the line 15 is released the weight 11' will move downwardly within the hollow pole so as to cause the unwinding of the cable 11 from the drum and the consequent rotation of the shaft 9 and reel 12 resulting of the winding of the line 15 thereon, the free end of the line being prevented from passing through the housing 13 by reason of the presence of the hook 16.

From a consideration of Figures 1 and 2 it will be apparent that the reel protecting segmental housing 13 is free to swing in a limited degree upon the shaft 9 over said reel. However, it is advantageous that the housing cover the upper area of the reel when the line 15 is wound thereon. The pivoted housing 13 provides a means for protecting the clothes line against rain and snow when in a reeled condition and not in use. When the hook 16 is disengaged from the eye 17, and the clothes line is wound on the reel 12 in the manner as heretofore explained due to the downward movement of the weight 11' within the hollow pole or standard 5, and when said hook engages the housing 13 at the opening 14, the further downward movement of the weight will cause the housing 13 to swing in a rearward direction, and the depending finger 19 which is associated with the side of the housing will engage the hanger 8 and limit the swinging movement of the housing in the manner as clearly illustrated in Figures 2 and 4 of the drawing. Further movement of the housing is prevented by a depending finger 19 formed at one side of this housing directly in back of the pivotal connection with the shaft 9 this finger being provided for the purpose of striking against the hanger 8 as clearly indicated in Figure 2.

It will thus be seen that we have provided a highly novel, simple, and efficient combined pole and clothes line reel that is well adapted for all the purposes heretofore designated, even though we have herein shown and described the invention as consisting of certain detail structural elements, it is nevertheless to be understood that minor changes may be made therein without affecting the spirit and scope of the appended claims.

Having thus described the invention, what we claim is:—

1. In a device of the class described, a supporting standard, a shaft journaled transversely on the upper end of the standard, a reel mounted on the shaft for rotation, a clothes line secured at one end on the reel and adapted to be wound therearound, a segmental housing for the upper major portion of the reel, said segmental housing being loosely mounted on the shaft and adapted for swinging movement, said housing being formed with an opening in its peripheral face through which the clothes line passes, and coacting means on the standard and said housing for limiting the pivotal movement of the housing in one direction.

2. In a device of the class described, a pole adapted to be anchored at its lower end, a substantially inverted U-shaped shaft hanger supported on the upper end of the pole, a transverse shaft journaled for rotation between the arms of said hanger, a reel mounted upon the shaft, a clothes line attached at one end to the reel and adapted to be wound therearound, a segmental housing loosely pivoted on the shaft within the U-shaped hanger and disposed over the upper portion of the reel, said housing being formed with an opening through which the clothes line passes, said housing adapted to swing in one direction when the clothes line is unreeled, and means for limiting the swinging movement of the housing in the opposite direction when the clothes line is wound on the reel.

In testimony whereof we affix our signatures.

OSCEOLA KANAWYER.
HOWARD KEENER.